United States Patent
Knaappila et al.

(10) Patent No.: US 11,736,920 B2
(45) Date of Patent: *Aug. 22, 2023

(54) RESOURCE FILTERING FOR WIRELESS DEVICES

(71) Applicant: Silicon Laboratories Inc., Austin, TX (US)

(72) Inventors: Jere M. Knaappila, Evitskog (FI); Jani K. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,344

(22) Filed: Sep. 1, 2021

(65) Prior Publication Data
US 2021/0400456 A1 Dec. 23, 2021

Related U.S. Application Data

(63) Continuation of application No. 15/362,279, filed on Nov. 28, 2016, now Pat. No. 11,129,008.

(51) Int. Cl.
  *H04W 4/80* (2018.01)
  *H04W 76/10* (2018.01)
  *H04W 84/18* (2009.01)
  *H04W 8/18* (2009.01)

(52) U.S. Cl.
  CPC ............. *H04W 4/80* (2018.02); *H04W 76/10* (2018.02); *H04W 8/18* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,723,729 B2 | 5/2014 | Desai et al. | |
| 8,965,284 B2 | 2/2015 | Honkanen et al. | |
| 9,338,638 B1* | 5/2016 | Palin | H04W 12/37 |
| 10,492,050 B2 | 11/2019 | Knaappila | |
| 11,129,008 B2 | 9/2021 | Knaappila | |
| 2014/0321321 A1 | 10/2014 | Knaappila | |
| 2015/0131517 A1* | 5/2015 | Chu | H04L 5/0007 370/312 |

(Continued)

OTHER PUBLICATIONS

"LE Advertising Extensions", May 31, 2016, 86 pgs.

(Continued)

*Primary Examiner* — Mariela Vidal Carpio
(74) *Attorney, Agent, or Firm* — Egan, Enders & Huston LLP.

(57) ABSTRACT

Systems and methods are provided that may be implemented to use resource filtering to provide multiple different device personalities and/or multiple different resources from a radio frequency (RF)-enabled wireless device or apparatus to one or more other connecting RF-enabled wireless devices across one or more wireless connections. In one example, each different given resource of a wireless device may be associated with at least one filter which may be used by the device to determine which connection/s the given resource may be provided, and a given resource may only be provided to a given connecting device only if the given resource passes the filter.

33 Claims, 9 Drawing Sheets

(56) References Cited

U.S. PATENT DOCUMENTS

| | | | |
|---|---|---|---|
| 2015/0146807 A1* | 5/2015 | Zhang | H04B 7/0632 |
| | | | 375/260 |
| 2015/0271628 A1 | 9/2015 | Knaappila | |
| 2015/0271786 A1* | 9/2015 | Xue | H04W 74/0816 |
| | | | 370/329 |
| 2015/0319600 A1 | 11/2015 | Knaappila | |
| 2017/0006039 A1* | 1/2017 | Ernohazy | H04W 48/20 |
| 2017/0164186 A1 | 6/2017 | Yong et al. | |
| 2017/0201499 A1 | 7/2017 | McLaughlin et al. | |
| 2018/0152979 A1* | 5/2018 | Lee | H04W 4/80 |
| 2018/0242182 A1* | 8/2018 | Rashid | H04W 88/06 |
| 2019/0130750 A1* | 5/2019 | Cole | G06F 16/958 |
| 2019/0166490 A1* | 5/2019 | Lee | H04W 12/55 |
| 2019/0349718 A1* | 11/2019 | Kwon | H04W 12/0431 |
| 2019/0361740 A1* | 11/2019 | Zhao | G06F 9/50 |
| 2020/0029371 A1* | 1/2020 | Achtien | H04L 67/303 |
| 2020/0103513 A1* | 4/2020 | Knaappila | H04B 17/27 |

OTHER PUBLICATIONS

Getting Started With Bluetooth Low Energy, Chapter 4, GATT (Services And Characteristics), Printed From Internet Nov. 22, 2016, 31 pgs.

Townsend, "Introduction To Bluetooth Low Energy", Adafruit Learning System, Apr. 2014, 11 pgs.

\* cited by examiner

RESOURCE FILTERING FOR WIRELESS DEVICES

This application is a continuation of U.S. patent application Ser. No. 15/362,279 filed on Nov. 28, 2016 and entitled "Resource Filtering for Wireless Devices", which is incorporated herein by reference in its entirety for all purposes.

FIELD

The disclosed systems and methods relate to wireless communication and, more particularly, to advertisement policies for wireless communication.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertisement packets which the master device (also known as scanner device, i.e. "scanner") is scanning. Depending on the type of advertisement packet sent by a slave device, the master device may respond to the received advertisement packet by requesting a connection with the slave device, or may respond by requesting further information from the advertising device. Beacons are a particular type of BLE advertiser device that transmit advertisement packets with a unique identifier to nearby portable electronic devices such as smart phones. An application on a portable electronic device may respond to information within an advertisement packet received from a beacon by performing an action, such as approximating the location of the portable device.

SUMMARY

Disclosed herein are systems and methods that may be implemented to use resource filtering to provide multiple different device personalities and/or multiple different resources from a single common radio frequency (RF)-enabled wireless device or apparatus (e.g., such as a BLE module) to one or more other connecting RF-enabled wireless devices across different wireless connections (e.g., such as different BLE wireless connections between different BLE devices). Examples of such different resources that may be so provided include, but are not limited to, different Bluetooth services, security manager, a portion of one or more parts of a BLE service such as BLE service characteristics, and/or any other different computing or wireless operation services. In one embodiment, each different given resource (e.g., service) of a wireless device may be associated with at least one filter which may be used by the device to determine which connection/s the given resource may be provided. In such an embodiment, a given resource may only be provided to a given connecting device only if the given resource passes the filter.

In the practice of the disclosed systems and methods, a resource filter may be based, for example, on one or more connection characteristics such as remote device address or local device address (e.g., connecting device identity), advertisement sets, bonding information (e.g., stored cryptographic keys), received signal strength, received signal angle of arrival (AoA) or angle of departure (AoD) and/or any other requirements which may either be predefined and/or provided by a user. In one exemplary embodiment, resources may be filtered using a bitmask in which each bit corresponds to an advertisement set. In one embodiment, a Wireless device may be configured to use resource filtering of the disclosed systems and methods to support multiple device personalities in a single common wireless device (e.g., such as a BLE module). Advantageously, a wireless device may be configured in one embodiment with resource filtering capability to support multiple services (e.g., such as multiple different home automation protocols and/or or other protocols) from the same device at the same time, using relatively few resources and/or without software updates. In a further embodiment, a first wireless device may be so configured in advance to provide different selected services to one or more other RF devices before the wireless device is connected to other wireless devices, thus reducing software complexity and potential for race conditions that can occur if services are configured on the fly after connection to other wireless devices.

In one respect, disclosed herein is a method including using at least one programmable integrated circuit of a first wireless device to: form one or more wireless connections with one or more other wireless devices, each of the wireless connections being made between the first wireless device and a different one of the other wireless devices; implement multiple resources on the first wireless device; use at least one resource filter to select one or more resources to make available to each given one of the other wireless devices based on at least one characteristic of the wireless connection between the first wireless device and the given other wireless device; and provide the resources selected for each given other wireless device to the given other wireless device across the corresponding wireless connection between the first wireless device and the given other wireless device.

In another respect, disclosed herein is an apparatus including at least one programmable integrated circuit coupled to radio circuitry and configured to be coupled to an antenna as a first wireless device. The at least one programmable integrated circuit may be programmed to: form one or more wireless connections with one or more other wireless devices, each of the wireless connections being made between the first wireless device and a different one of the other wireless devices; implement multiple resources on the first wireless device; use at least one resource filter to select one or more resources to make available to each given one of the other wireless devices based on at least one characteristic of the wireless connection between the first wireless device and the given other wireless device; and provide the resources selected for each given other wireless device to the given other wireless device across the corresponding wireless connection between the first wireless device and the given other wireless device.

DESCRIPTION OF ILLUSTRATIVE EMBODIMENTS

Figure 1:
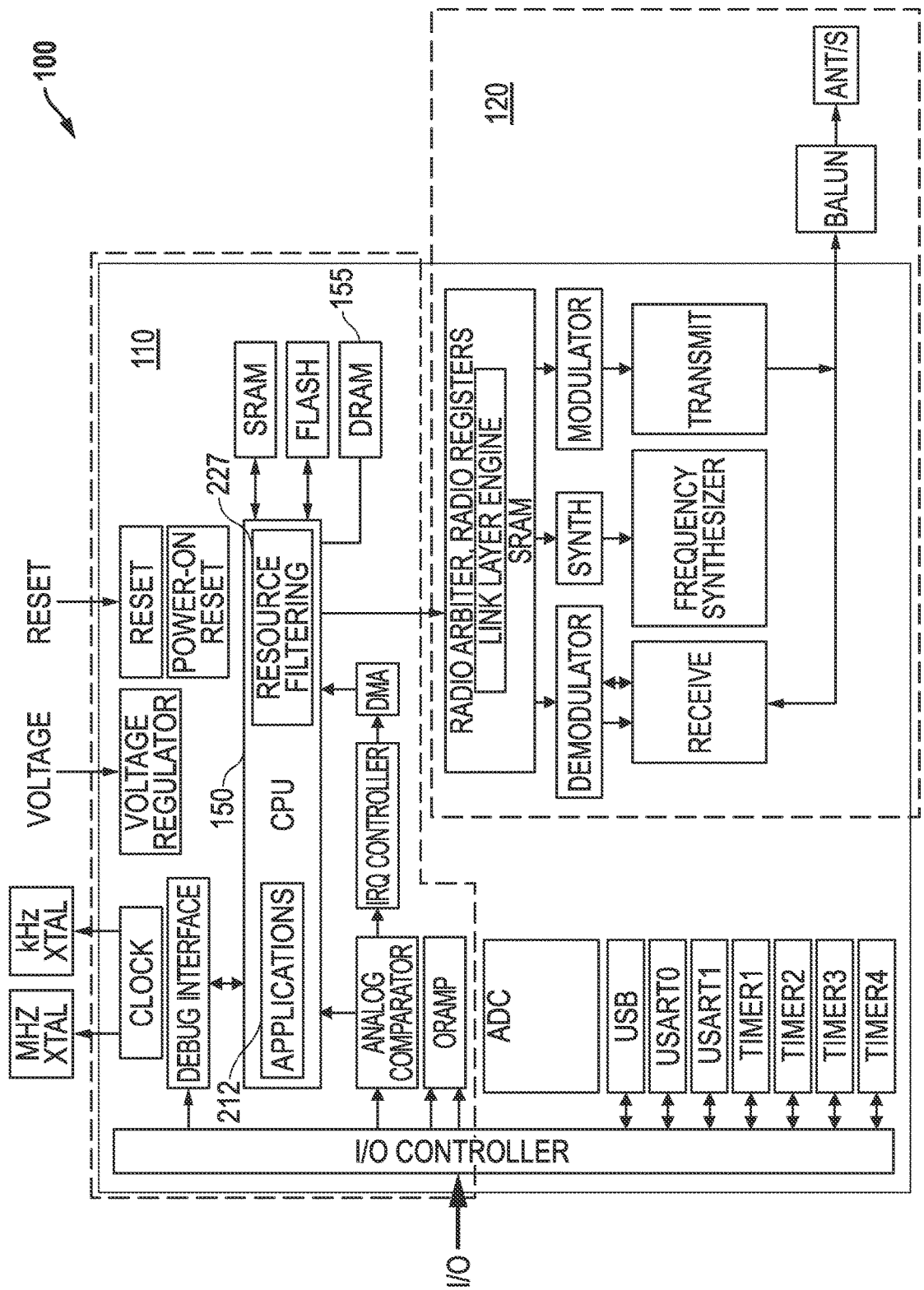
FIG. 1 illustrates a simplified block diagram of a wireless device according to one exemplary embodiment of the disclosed systems and methods.

FIG. 1 illustrates a simplified block diagram of an exemplary wireless device in the form of a BLE module 100 that may be employed to implement the disclosed systems and methods. As shown, BLE module 100 includes a first module segment 110 that includes one or more central processing units (CPUs), processors or other programmable integrated circuits 150 and memory 155 (e.g., DRAM) with application data. As shown application/s 212 may be executed by CPU 150 to provide multiple different resources (e.g., such as different Bluetooth services, security manager, parts of a Bluetooth service such as Bluetooth service characteristics, and/or any other computing or wireless operation services) to other connecting RF-enabled devices across different wireless connections (e.g., such as different BLE wireless connections between different BLE devices). Resource filtering 227 may be executed by CPU 150, for example, to selectably provide multiple different resources (e.g., services or parts of services) to other connecting devices across different respective wireless connections (e.g., such as different BLE wireless connections between different BLE devices) in a manner as described further herein.

Still referring to FIG. 1, a second module segment 120 is configured to implement a part of a link layer and physical layer for radio module 100, and includes radio components and circuitry such as radio registers, link layer engine, modulator-demodulator, receiver and transmitter (transceiver), frequency synthesizer, balancing-unbalancing unit ("balun"), one or more antennas ("ant/s"). In one embodiment, second module segment 120 may include memory and one or more microcontrollers, processors, programmable logic devices (PLDs), or other programmable integrated circuits programmed or otherwise configured to execute one or more components of module segment 120, e.g., such as a link layer engine.

In one embodiment, second module segment 120 may be configured to determine angle of arrival (AoA) or angle of departure (AoD) of a signal received from another device (e.g., such as a BLE device). For example, antennas of second module segment 120 may be configured as a fixed or adaptive phased array coupled to processing components of second module 120 that are programmed to determine AoA of a signal received from another device by measuring amplitude and/or phase of the signal at each antenna element in the antenna array. In one exemplary embodiment, processing components of second module 120 may determine AoA of a received signal by using time difference of arrival (TDOA) techniques to measure the delay, or difference in received phase, of the received signal at each antenna element in the antenna array relative to another antenna element/s in the antenna array and which may include, for example, switching through the different elements of the array. At least a portion of such a received signal may be constant frequency to aid measurement of phase shift or TDOA between antenna elements. In another exemplary embodiment, processing components of second module 120 may determine AoD of a received signal such as may be transmitted from a switched array or beamformer of another device, e.g., based on measured phase and/or amplitude of the received signal together with transmit antenna array configuration information and/or transmit array switching information (e.g., switching pattern information) received in one or more packets from the other device.

In one embodiment the one or more programmable integrated circuits, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by programmable integrated circuits of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to one or more antennas as shown. Second module segment 120 may include a radio that includes baseband processing, MAC (media access control) level processing, beamforming or TDOA processing, and/or other physical layer processing for BLE packet communications. The programmable integrated circuits of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a AC mains wall outlet.

Figure 2A:
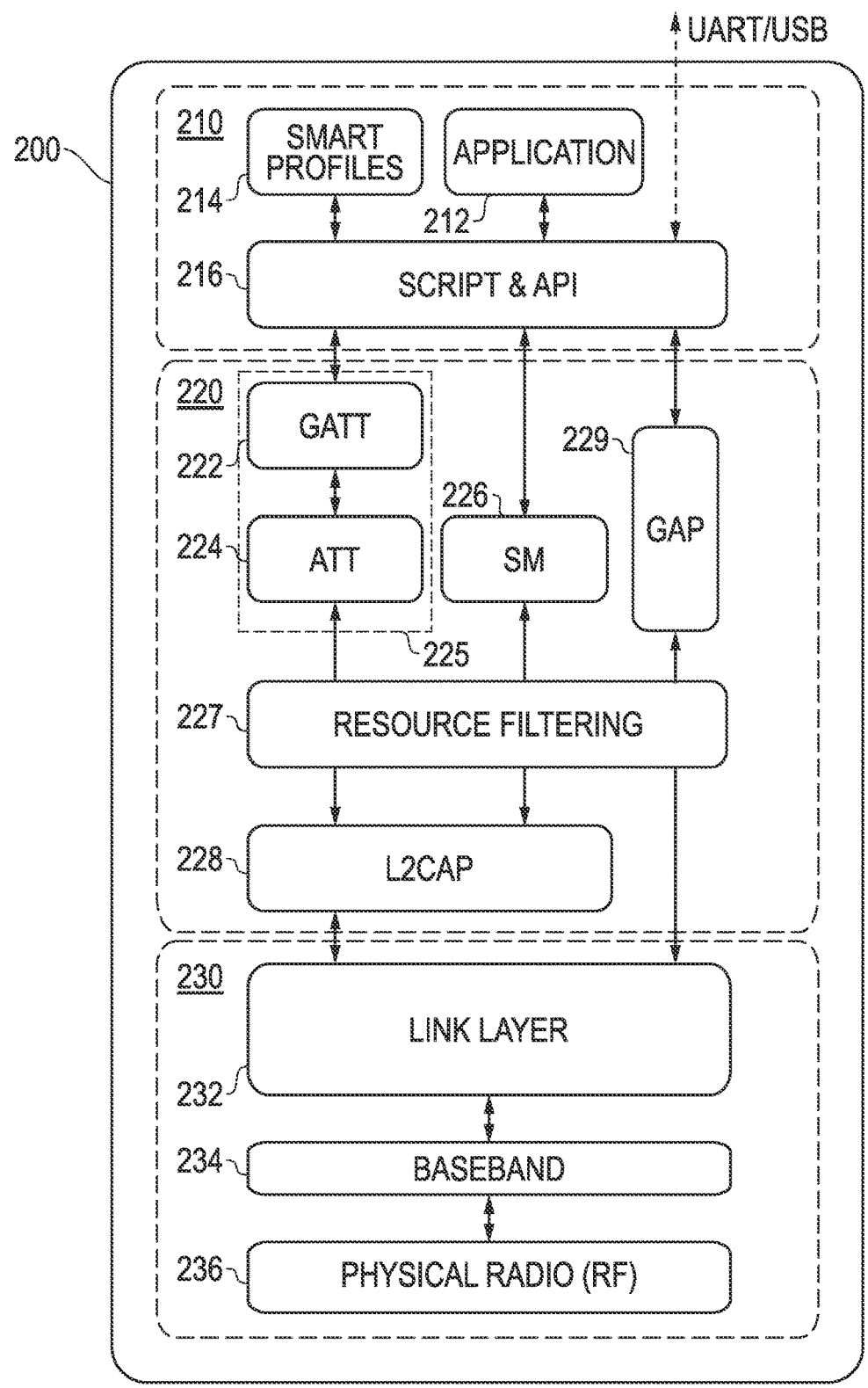
FIG. 2A is a simplified illustration of components of a Bluetooth smart module according to one exemplary embodiment of the disclosed systems and methods.

FIG. 2A is a simplified illustration of application, host and BLE control components of a Bluetooth smart module 200 configured according to one exemplary embodiment of the disclosed systems and methods. Although a Bluetooth smart module is illustrated, it will be understood that the disclosed systems and methods may be implemented with any other RF communication technology that employs multiple resources and wireless connections between individual RF devices. Components of Bluetooth smart module 200 may be implemented, for example, using the hardware components of radio module 100 or any other suitable combination of radio hardware components.

As shown in FIG. 2A, Bluetooth smart module 200 of this embodiment includes application layer 210, host layer 220 and a Bluetooth (or BLE) controller 230. Application layer 210 may include, for example, apparatus-related application/s 212 (e.g., heart rate, proximity, blood pressure, time update, temperature, battery, lighting control, home automation control, etc.), smart profiles 214, and script and application programming interface (API) 216. Host layer 220 includes protocols running over the connection. Host layer 220 also includes data to be used in advertisement profile or Generic Attribute Profile (GATT) 222, generic access profile (GAP) 229, attribute protocol (ATT) 224, security manager (SM) 226 and logical link control and adaptation protocol (L2CAP) 228. Together GATT 222 and ATT 224 provide services 225 for Bluetooth smart module 200 that define an interface with other BLE devices connected to Bluetooth smart module 200 for reading and/or writing data for applications 212. Resource filtering 227 is provided as shown between services 225 and BLE controller 230 for filtering one or more of multiple services 225 for one or more corresponding connecting devices to Bluetooth smart module 200.

As further shown in FIG. 2A, Bluetooth (or BLE) controller 230 also includes link layer 232, baseband 234, and physical layer 236 (i.e., physical radio, radio frequency RF). Link layer 232 is present to provide ultra-low power idle mode operation and device discovery (i.e., connection mode and advertising mode handling). Link layer 232 is also configured to control packet transmission and response. Link layer 232 may be configured to support one or more connections or may in one embodiment be configured with multiple virtual link layers that are simultaneously operating, and a scheduler that is configured to control access of the virtual link layers to common radio resources of physical layer 236 through baseband 234 in a manner described in U.S. patent application Ser. No. 15/234,332 filed Aug. 11, 2016, which is incorporated herein by reference in its entirety for all purposes.

In one embodiment, application layer 210 of FIG. 2A may be capable of reading sensor data (e.g., from heart rate sensor, proximity sensor, temperature sensor, etc.), and reporting the data to host layer 220 for transmission using Bluetooth (or BLE) controller 230 from Bluetooth smart module 200 to one or more other BLE-enabled devices across one or more connections. In another embodiment, application layer 210 of Bluetooth smart module 200 may be additionally or alternatively capable of exchanging (receiving or transmitting) data, control and/or configuration information through host layer 220 and BLE controller 230 with other BLE-enabled devices across one or more connections. Although exemplary embodiments are illustrated and described herein in relation to Bluetooth smart module 200 of FIG. 2A, it will be understood that the disclosed systems and methods may be implemented for resource filtering with any other type of wireless-enabled device that is configured to provide resources to other wireless-enabled devices across one or more wireless connections.

In BLE technology, one or more so called slave devices may be connected to a master device. The master may be configured to communicate with one or more slave devices—also simultaneously. To let the master know about the slave devices before connection is established between the devices, the slave devices (or at that point "advertisers") may periodically, at pseudo-random intervals, pass advertisement packets which a master device (also known as scanner device, i.e. "scanner") is scanning.

Example advertisement packet types that may be transmitted from a slave device include:

ADV_IND connectable and scannable undirected advertising event

ADV_DIRECT_IND connectable directed advertising event

ADV_NONCONN_IND non-connectable or non-scannable undirected advertising event

ADV_SCAN_IND scannable undirected (non-connectable) advertising event.

Example types of response packets that may be transmitted by a scanning device in response to received advertisement packets of the advertising device include:

SCAN_REQ scan request for further information from advertiser

CONNECT_REQ connect request.

If the advertiser sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange long term keys or other encryption info to be stored for future connections. In another case, the connection may be encrypted only for the duration of the connection by pairing, during which short term keys are exchanged between the master device and slave device.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices. After a connection is established between two devices, service and/or service characteristic discovery may occur (with or without pairing or bonding first taking place) during which a first one of the connected devices may send a request to the second connected device asking for a list of services and/or service characteristics that are available from the second device. For example, the second device may respond to this request by providing GATT data to the first device that includes a list of the available BLE services from the second device and/or BLE service characteristics (e.g., configuration data or user data for a service) of the second device. The GATT data may include a list of service universally unique identifiers (UUIDs) and/or service characteristic UUIDs.

The state for passing advertising packets is called "advertising state" and the state for connection is called "connected state". In both states, data transfer occurs. A slave device may be a sensor, actuator or other device, such as a temperature sensor, heart rate sensor, lighting device, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 2015/0271628, each of which is incorporated herein by reference in its entirety for all purposes.

Figure 2B:
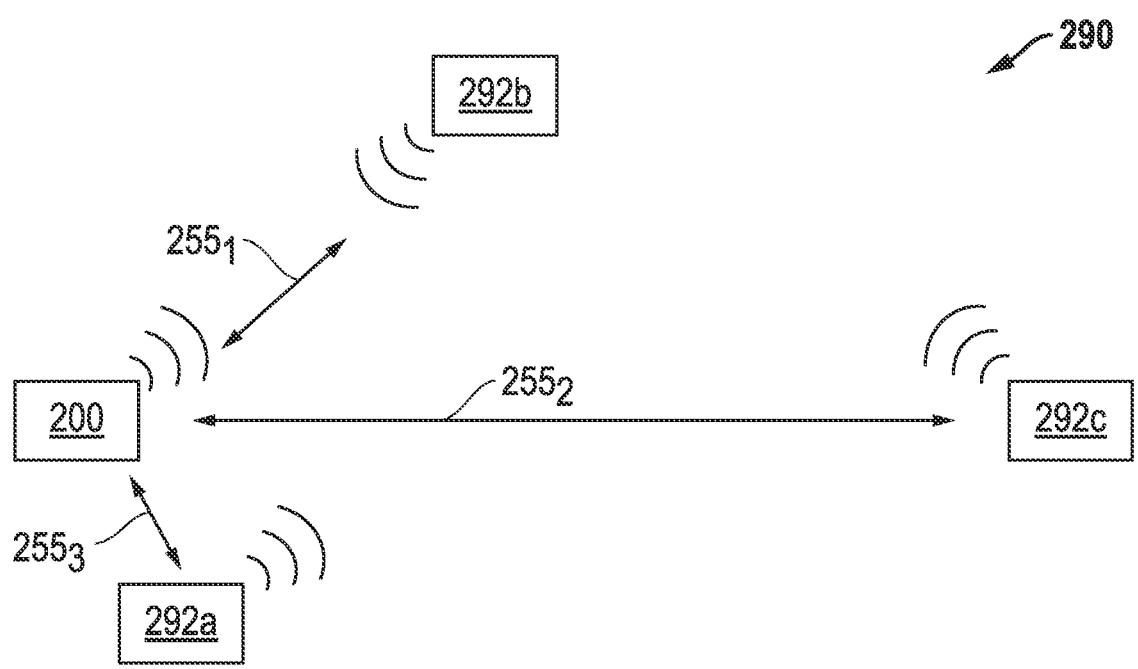
FIG. 2B illustrates a BLE wireless environment according to one exemplary embodiment of the disclosed systems and methods.

FIG. 2B illustrates one exemplary embodiment of a BLE wireless environment 290 in which Bluetooth smart module 200 is wirelessly communicating with other BLE-enabled wireless devices 292a, 292b and 292c (e.g., which may be configured similarly to Bluetooth smart module 200). In this case, each of wireless devices 292a, 292b and 292c is connected with Bluetooth smart module 200 by a respective separate BLE connection 255, e.g., such as the separate connections 255 of FIGS. 5A-5C described further herein. In this regard, Bluetooth smart module 200 may present a different local device address to each of BLE connections 255 (e.g., such as described in relation to FIG. 5A), and each of connected wireless device present a different remote device address to Bluetooth smart module 200 (e.g., such as described in relation to FIG. 5B). Further, Bluetooth smart module 200 may measure a different received signal strength for each of BLE connections 255 (e.g., such as described in relation to FIG. 5C), e.g., due to the different distances between each of wireless devices 292a, 292b and 292c and Bluetooth smart module 200. It will be understood that FIG. 2A is exemplary only, and that the number wirelessly-enabled devices that are communicating with Bluetooth smart module 200 (as well as the number of concurrent connections 255 made with Bluetooth smart module 200) may vary, e.g., may be greater or less than three.

Figure 3:
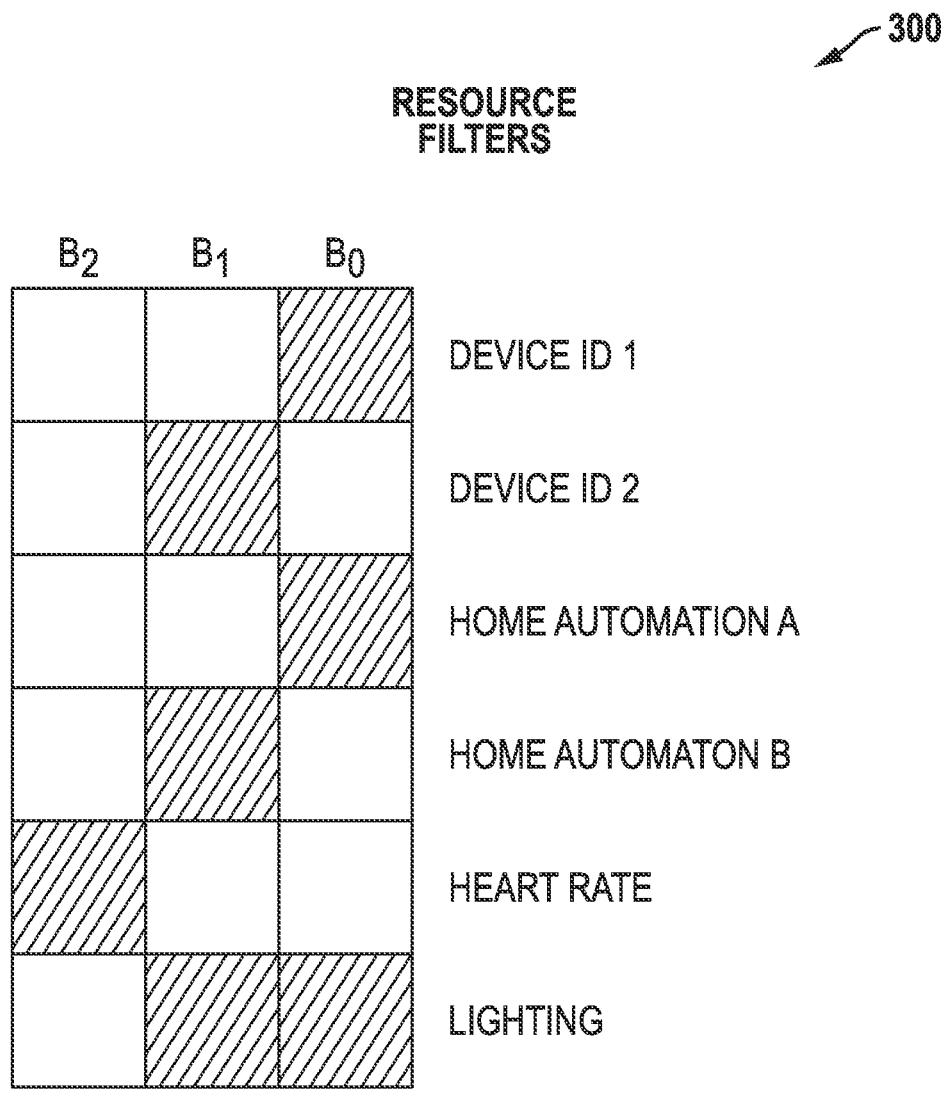
FIG. 3 illustrates resource filters according to one exemplary embodiment of the disclosed systems and methods.

FIG. 3 illustrates example resource filters 300 for filtering different resources of a wireless device, such as BLE module 100 of FIG. 1 that is implementing Bluetooth smart module 200. In one embodiment, resource filters 300 may be pre-configured and stored in memory of first module segment 110 of FIG. 1 prior to device startup and operation and/or connection, for later execution by host layer 220 of Bluetooth smart module 200. As shown, a resource filter 300 is provided for each of multiple Bluetooth services of Bluetooth smart module 200. Examples of Bluetooth services include, but are not limited to, BLE GATT services such as described in Bluetooth Core Specification 4.2., e.g., such as alert notification profile, automation IO profile and automation service, battery service, body composition service, blood pressure profile, blood pressure service, etc.

In this example, these services include miscellaneous device services (e.g., Device ID1 and Device ID2 that may be protocols for user-defined services or miscellaneous Bluetooth devices), different Home Automation protocol services (e.g., different home automation protocols available from different manufacturers such as Apple HomeKit, Samsung SmartThings, etc.), heart rate service (e.g., for heart rate monitor device), lighting service (e.g., for light bulb device), etc. In one exemplary embodiment, each service and its service characteristics may be filtered by a corresponding filter 300 based on selected bit value/s, e.g., Device ID1 service is allowed only for selected first bit value $B_0$, Device ID2 service is allowed only for selected second bit value $B_1$, Home Automation A protocol is allowed only for selected first bit value $B_0$, Home Automation B protocol is allowed only for selected second bit value $B_1$, Heart Rate service is allowed only for selected third bit value $B_2$, and Lighting service is allowed only for selected first and second bit values $B_0$ and $B_1$. Examples of service characteristics include, but are not limited to, location of body sensor for a heart rate service, beats per minute data for a heart rate service, light bulb wattage for lighting service, etc. In another embodiment, at least a portion of the service characteristics of a given service may be filtered in a similar manner by a corresponding filter, e.g., in one example only a portion of such service characteristics may be filtered while other characteristics of the same service are allowed.

When allowed (or passed) by filters 300 to another connecting (including connected) device, each of the services of filters 300 may be provided by Bluetooth smart module 200 to the other connecting Bluetooth device, e.g., so as to allow applications 212 of Bluetooth smart module 200 corresponding to the allowed services to send control information and/or data to the other connecting Bluetooth device, and/or to receive control information and/or data from the other connecting Bluetooth device, a combination thereof, etc. In one embodiment, when another connecting Bluetooth smart (BLE) device is not allowed to access particular services (e.g., BLE services) of Bluetooth smart module 200, these not allowed services and their characteristics may be completely hidden from discovery by the other connecting Bluetooth smart device, i.e., so that it appears as if the Bluetooth smart module 200 does not provide these services at all.

It will be understood that the illustrated filters 300 are exemplary only, and that filters having more than three bit values for a given resource (e.g., $B_0$ to $B_N$), or less than three bit values for a given resource are alternatively possible. The illustrated resources (i.e., Bluetooth services 225) of FIG. 3 are exemplary in type and number, and it will be understood that other types of resources (e.g., GATT Characteristics, Security Manager 226), and/or that fewer or additional numbers of services may be similarly configured using resource filters. Besides bit masks, any other type of data structure suitable for filtering resources may be employed, e.g., such as look-up tables, data lists, Hashmaps, etc.

Figure 4B:
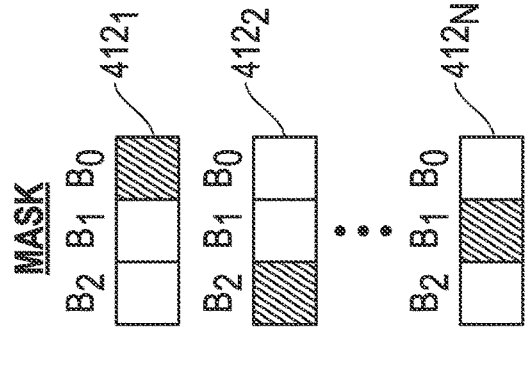
FIG. 4B illustrates resource filtering bit masks according to one exemplary embodiment of the disclosed systems and methods. according to one exemplary embodiment of the disclosed systems and methods.
Figure 4A:
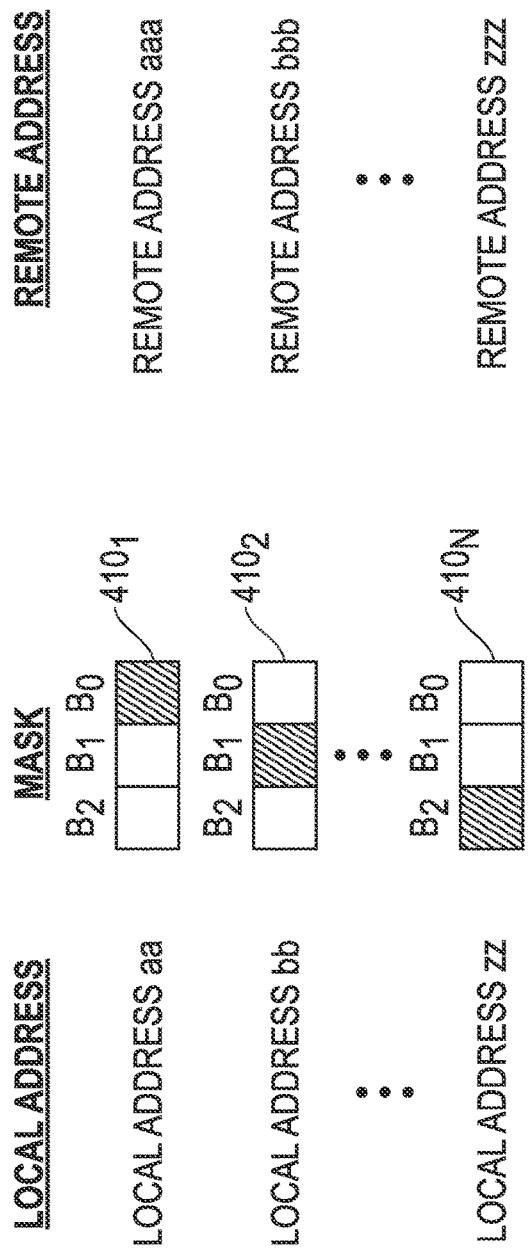
FIG. 4A illustrates resource filtering bit masks according to one exemplary embodiment of the disclosed systems and methods. according to one exemplary embodiment of the disclosed systems and methods.

FIG. 4A illustrates one exemplary embodiment of resource filtering bit masks that may be employed by a wireless device such as Bluetooth smart module 200 for filtering resources using the filters 300 of FIG. 3 according to multiple different local device addresses aa to zz, which represents any number of multiple possible local device addresses that may be configured for a Bluetooth smart module 200. In the embodiment of FIG. 4A, local address aa is assigned bit value $B_0$, local address bb is assigned bit value $B_1$, and local address zz is assigned bit value $B_2$. Multiple different local addresses may be provided by a single common Bluetooth smart module 200 to other connecting wireless devices, e.g., based on remote device address or signal strength of another connecting wireless device.

FIG. 4B illustrates another exemplary embodiment of resource filtering bit masks that may be employed by a wireless device such as Bluetooth smart module 200 for filtering resources according to multiple different remote device addresses aaa to zzz, which represents any number of multiple possible remote device addresses to which Bluetooth smart module 200 may be configured to connect. In the embodiment of FIG. 4B, remote address aaa is assigned bit value $B_0$, remote address bbb is assigned bit value $B_2$, and remote address zzz is assigned bit value $B_2$.

Figure 4C:
FIG. 4C illustrates resource filtering bit masks according to one exemplary embodiment of the disclosed systems and methods. according to one exemplary embodiment of the disclosed systems and methods.

FIG. 4C illustrates another exemplary embodiment of resource filtering bit masks that may be employed by a wireless device such as Bluetooth smart module 200 for filtering resources according to multiple different connecting device received signal strength ranges. In the embodiment of FIG. 4C, received signal strength range of greater than −60 dBm is assigned bit value $B_2$, received signal strength range of from −60 dBm to −80 dBm is assigned bit value $B_1$, and received signal strength range of less than −80 dBm is assigned bit value $B_0$. It will be understood that received signal strength value ranges for a connecting device may be expressed in other units besides dBm (e.g., such as mW), or may be expressed using relative values (rather than absolute received signal strength values) such as using received signal strength indicator (RSSI) values. It will also be understood that the illustrated bit masks are exemplary only, and may take other forms or include fewer or additional bits.

Figure 5A:
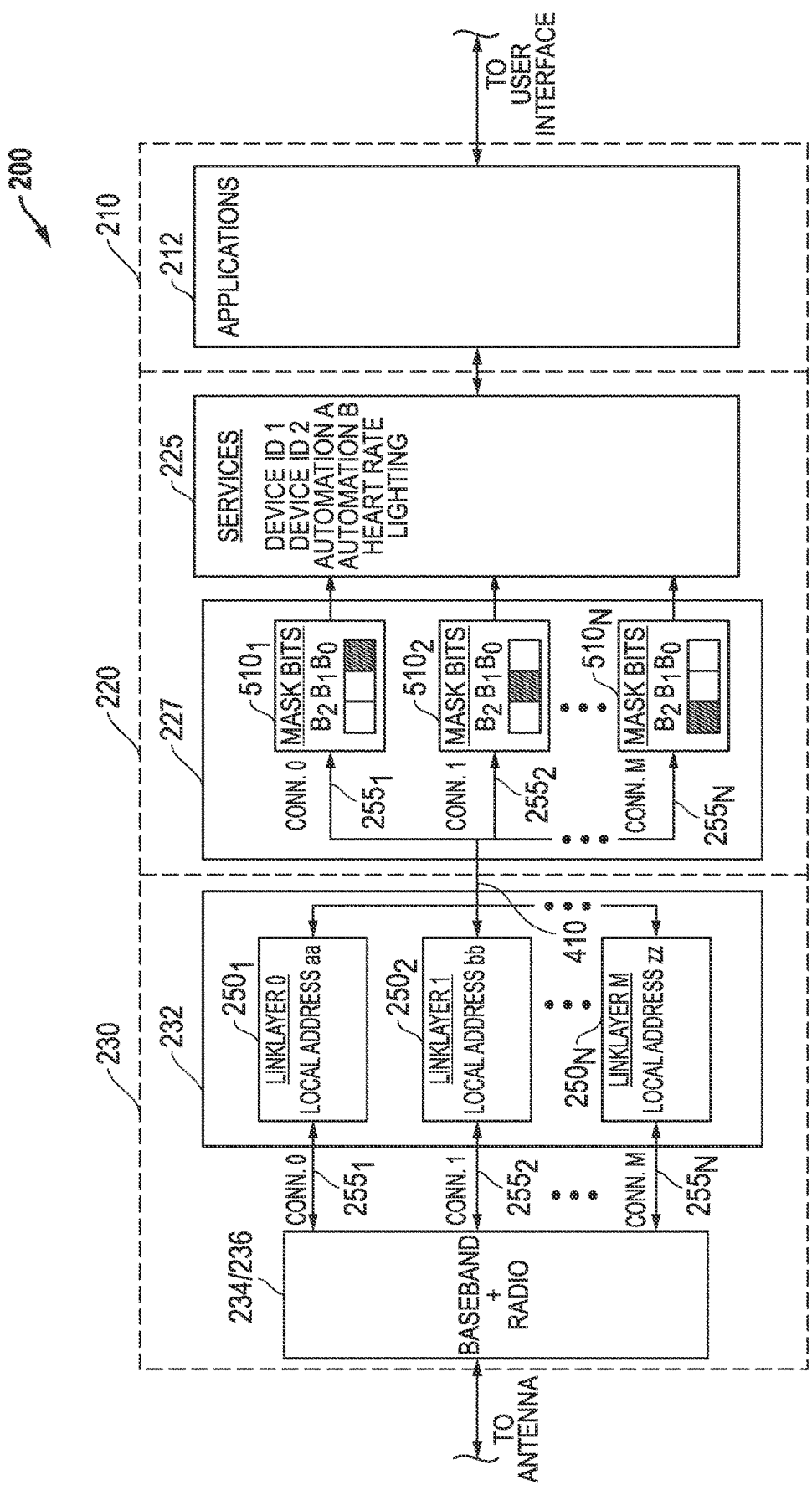
FIG. 5A illustrates a Bluetooth smart module configured to perform resource filtering according to one exemplary embodiment of the disclosed systems and methods.

FIG. 5A illustrates Bluetooth smart module 200 as it may be configured to perform resource filtering according to one exemplary embodiment of the disclosed systems and methods. In the embodiment of FIG. 5A, link layer 232 is implemented as part of BLE controller 230 between baseband and radio components 234/236 and host layer 220 as shown. In this exemplary embodiment, link layer 232 is configured to simultaneously implement and operate multiple independent virtual link layers $250_1$ to $250_N$ that each may each have its own set of different advertisement parameters (e.g., packet type or advertisement mode, advertisement interval, advertisement data, transmit power and sensitivity levels, device address, device identity, etc.), and each virtual link layer 250 may operate independently of all other virtual link layers 250. In this regard, each of virtual link layers 250 may be configured to independently respond to specific advertising, scan and connection enable commands individually addressed to each of virtual link layers 250 and received through host interface 410 and host layer 220 from application layer 210. This allows each of the multiple virtual link layers $250_1$ to $250_N$ to implement its own unique advertisement and connection policies such that the BLE module 200 may transmit advertisement packets using different advertisement policies and/or make different connections. In this way, multiple advertisement policies and/or connections may be implemented by the same device. Further information on implementation and operation of multiple virtual link layers may be found in U.S. patent application Ser. No. 15/234,332 filed Aug. 11, 2016, which is incorporated herein by reference in its entirety for all purposes.

As shown in FIG. 5A, link layer 232 may be configured to support multiple connections $255_1$ to $255_N$ which in one embodiment may be enabled at the same time for Bluetooth smart module 200. Each of multiple connections 255 may be made with a different separate connecting device, e.g., such as another Bluetooth smart module 200. As further show in in FIG. 5A, resource filtering is implemented by host layer 220 to filter BLE services 225 based on different mask bits that are assigned to each of different connections $255_1$ to $255_N$ based on a corresponding bit mask 410, 412 or 414 (depending on selected connection characteristic) such as illustrated and described in relation to FIGS. 4A to 4C. For example, in the illustrated case of FIG. 5A, mask bits $510_1$ to $510_N$ are assigned to respective connections $255_1$ to $255_N$ based on connection characteristic that is respective local address of each of connections $255_1$ to $255_N$ using bit masks 410 of FIG. 4A, e.g., connection $255_1$ having local address aa is assigned bit value $B_0$, local address bb is assigned bit value $B_1$, and local address zz is assigned bit value $B_2$.

Once mask bits 510 of FIG. 5A have been assigned as described above, services 225 are filtered for each connection 255 according to resource filters 300 of FIG. 3 based on the bit values assigned to each connection 255. In this regard, the assigned bit value for each connection 255 is applied to resource filters 300 to determine which services 225 are allowed to be discovered by another connecting device and to be provided by the current Bluetooth smart module 200 to another connecting device. Such services 225 may include, but are not limited to, reading sensor data (e.g., from a connected heart rate sensor, proximity sensor, temperature sensor, etc.), and reporting the data to host layer 220 for transmission using Bluetooth (or BLE) controller 230 from the current Bluetooth smart module 200 to one or more other BLE-enabled devices across one or more connections 155, exchanging (receiving or transmitting) other data, control and/or configuration information through host layer 220 and BLE controller 230 with other BLE-enabled devices across one or more connections, etc. In one embodiment, mask bits 510 from bit masks 410 may be automatically assigned by resource filtering 227 of host layer 220 in real time to different connections 510 as these connections are established with other connecting wireless devices by Bluetooth smart module 200, and resources 225 automatically filtered based on resource filters 300 of FIG. 3.

Table 1 below summarizes the services allowed for each of connections 255 of FIG. 5A by resource filters 300 of FIG. 3 when resource filtering is based on local device address provided by Bluetooth smart module 200 to other connecting Bluetooth devices. In this case, each given connection 255 is assigned a mask bit value 510 from a corresponding bit mask 410 of FIG. 4A based on respective local device address of the given connection. In this embodiment, Bluetooth smart module 200 provides a different device personality that includes a different combination of allowed services to each of connections 0, 1 and N, e.g., such that multiple different home automation protocols and other services may be provided at the same time from the same wireless device to other connecting wireless devices. It will be understood that mask bits 510 may be automatically assigned by resource filtering 227 based on local device addresses of new connections as they are made by Bluetooth smart module 200 with connecting devices over time.

TABLE 1

| Connection No. | Local Address | Assigned Bit Value | Allowed Services |
| --- | --- | --- | --- |
| 0 | aa | $B_0$ | Device ID1 Home Automation Protocol A Lighting |
| 1 | bb | $B_1$ | Device ID2 Home Automation Protocol B Lighting |
| N | zz | $B_2$ | Heart Rate |

Figure 5B:
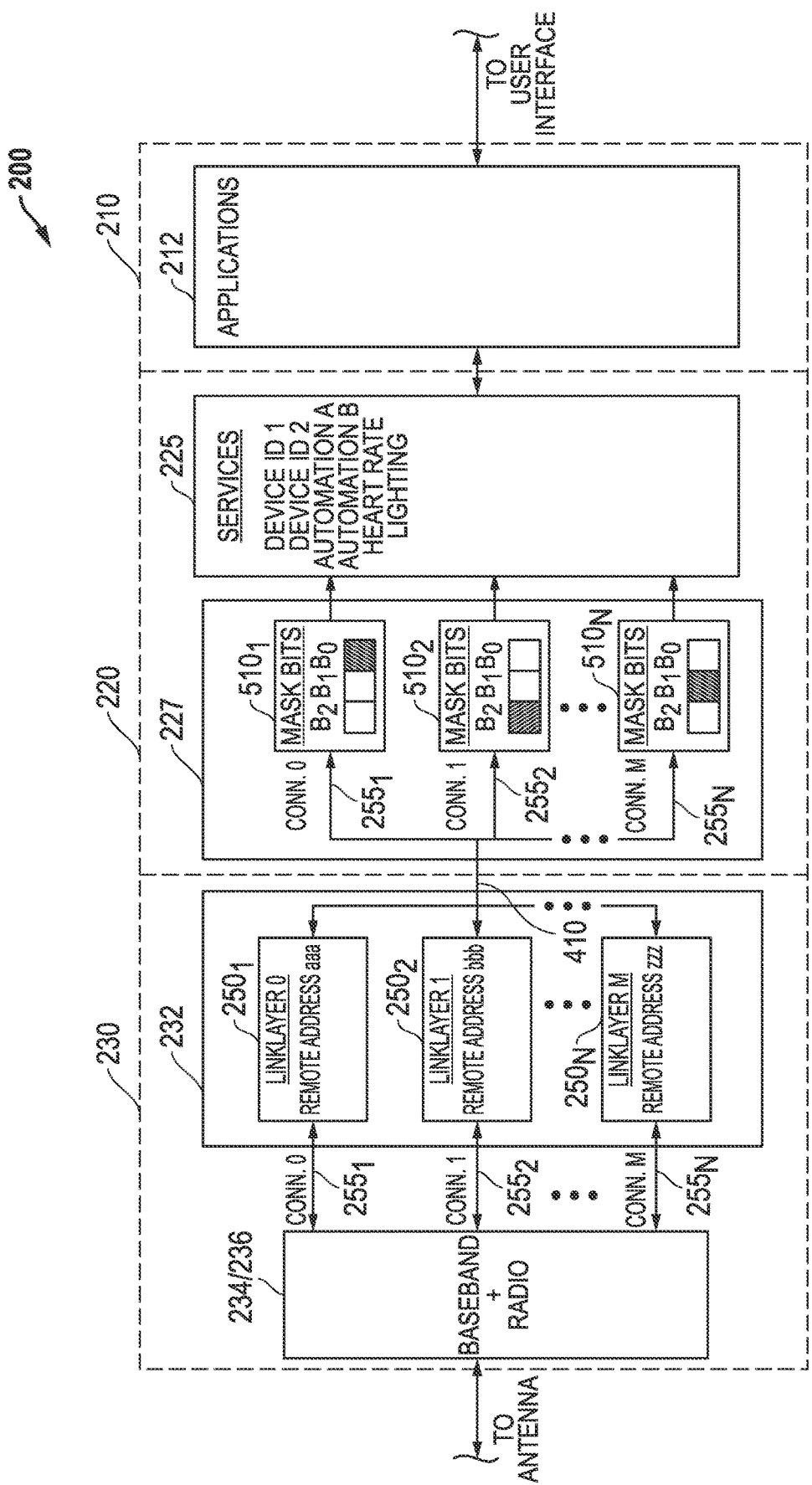
FIG. 5B illustrates a Bluetooth smart module configured to perform resource filtering according to one exemplary embodiment of the disclosed systems and methods.

FIG. 5B illustrates another exemplary embodiment of Bluetooth smart module 200 in which mask bits $510_1$ to $510_N$ are assigned to respective connections $255_1$ to $255_N$ based on connection characteristic that is the respective remote address of each of connections $255_1$ to $255_N$ using bit masks 412 of FIG. 4B, e.g., connection $255_1$ having remote address aaa is assigned bit value $B_0$, remote address bbb is assigned bit value $B_2$, and remote address zzz is assigned bit value $B_1$.

Table 2 below summarizes the services allowed for each of connections 255 of FIG. 5B by resource filters 300 of FIG. 3 when resource filtering is based on Remote device address of other Bluetooth devices connected to Bluetooth smart module 200. In this case, each given connection 255 is assigned a mask bit value 510 from a corresponding bit mask 412 of FIG. 4B based on respective Remote device address of the given connection. Once again, in this embodiment, Bluetooth smart module 200 provides a different device personality that includes a different combination of allowed services to each of connections 0, 1 and N. It will be understood that mask bits 510 may be automatically assigned by resource filtering 227 based on remote device addresses of new connections as they are made by Bluetooth smart module 200 with connecting devices over time.

TABLE 2

| Connection No. | Remote Address | Assigned Bit Value | Allowed Services |
| --- | --- | --- | --- |
| 0 | aaa | $B_0$ | Device ID1 Home Automation Protocol A Lighting |
| 1 | bbb | $B_2$ | Heart Rate |
| N | zzz | $B_1$ | Device ID2 Home Automation Protocol B Lighting |

Figure 5C:
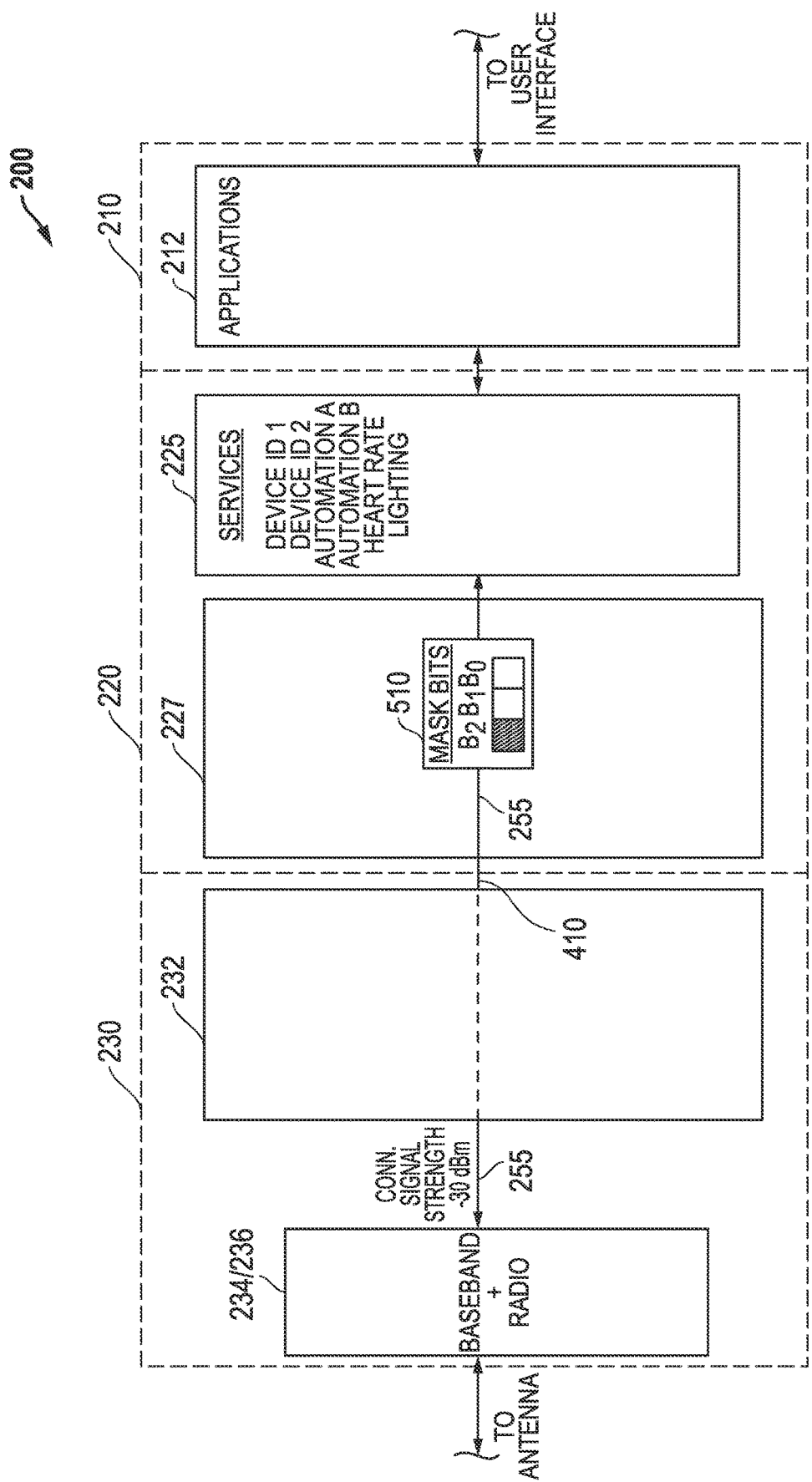
FIG. 5C illustrates a Bluetooth smart module configured to perform resource filtering according to one exemplary embodiment of the disclosed systems and methods.

FIG. 5C illustrates another exemplary embodiment of Bluetooth smart module 200 having a single link layer 232 in which mask bits 510 are assigned to a single connection 255 based on a connection characteristic that is real time measured signal strength of the current connection 255 (e.g., as measured in baseband 234 and/or radio 236) using bit masks 414 of FIG. 4C. In this case, the current measured signal strength of connection 255 is −30 dBm and connection 255 is assigned mask bit value $B_2$, it being understood that the assigned mask bit 510 may be automatically changed by resource filtering 227 over time as measured signal strength changes.

It will be understood that in other embodiments multiple concurrent (i.e., simultaneous) connections 255 having different received signal strengths made also be made to Bluetooth smart module 200, and that resource filtering 227 may filter resources simultaneously for each of given one of such concurrent connections according to the corresponding measured received signal strength of the given connection so as to provide a different device personality (i.e., having a different combination of discoverable and allowed services) from Bluetooth smart module 200 to each of the concurrent connections having different received signal strengths. For example, in one embodiment, Bluetooth smart module 200 may be only connectable to other wireless devices at relatively shorter distances from Bluetooth smart module 200 (e.g., such as to wireless device 292a of FIG. 2B via a first connection $255_3$ having a relatively higher received signal strength value) for over-the-air update/updata or device configuration, while at the same time being connectable to provide generic services (e.g., BLE services) to other wireless devices positioned at relatively further distances from Bluetooth smart module 200 (e.g., such as to wireless devices 292b and 292c of FIG. 2B via second and third connections $255_2$ and $255_3$ having relatively lower received signal strength value due to greater distance from Bluetooth smart module 200).

Figure 6:
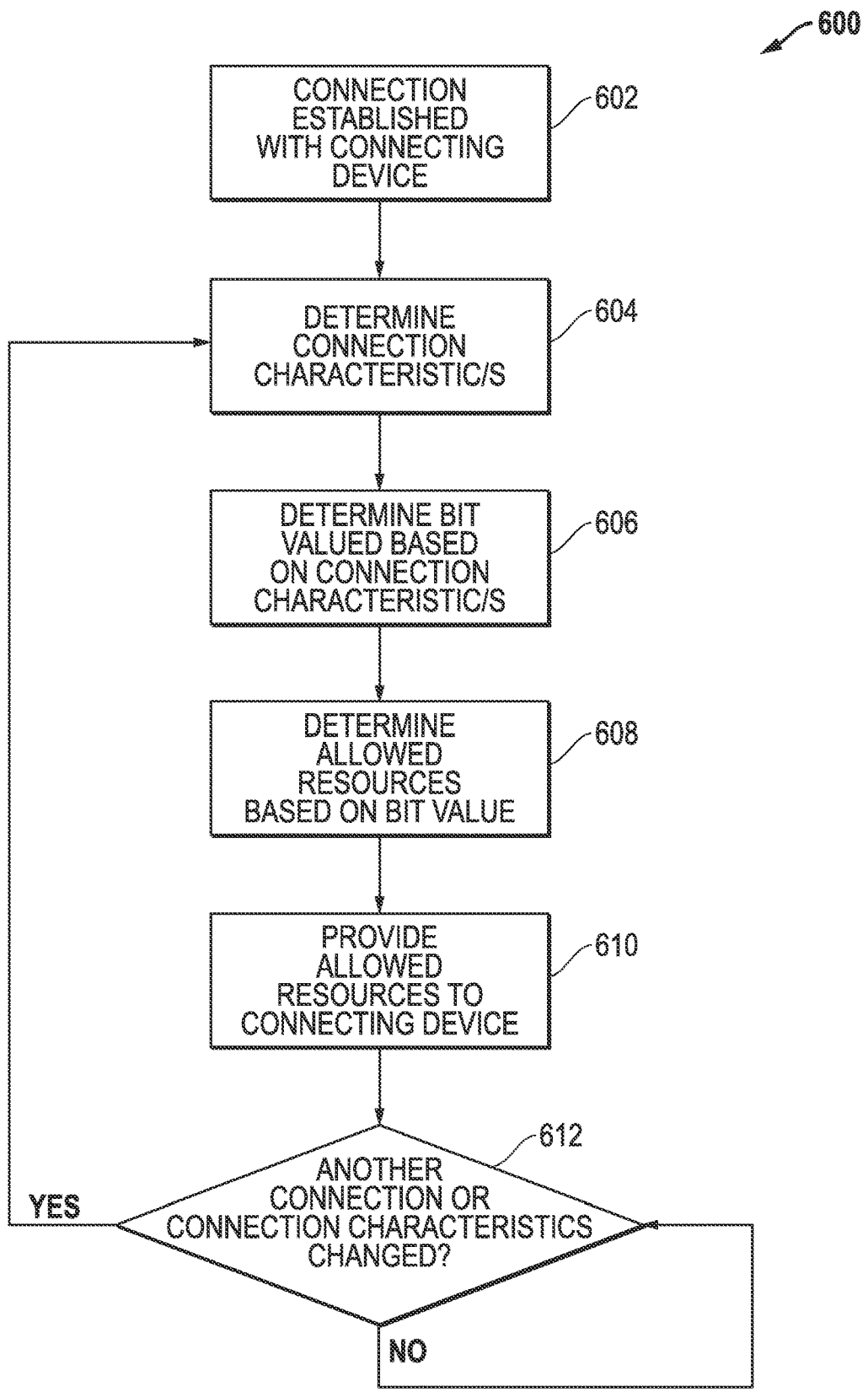
FIG. 6 illustrates resource filtering methodology according to one exemplary embodiment of the disclosed systems and methods.

FIG. 6 illustrates one exemplary embodiment of methodology 600 that may be employed to filter resources to provide multiple different device personalities and/or multiple different resources to other connecting wireless devices (e.g., BLE-enabled wireless devices 292a, 292b and 292c of FIG. 2B) from a first wireless device such as Bluetooth smart module 200 of FIG. 2B. In one embodiment, the steps of methodology 600 may be executed as part of resource filtering 227 of host layer 220 of FIG. 2 by programmed CPU 150 of BLE module 100 of FIG. 1. As shown in FIG. 6, methodology 600 begins in step 602 where at least one connection 255 is established between the first wireless device 200 and at least one other second connecting wireless device 292. The first wireless device 200 may be, for example, operating as a BLE advertiser device that has transmitted a connectable advertisement packet to a second scanning BLE wireless device 292 which has responded by transmitting a connect request packet that has in turn been accepted by the first wireless device 200 to establish the connection 255 with the second wireless device 292. Where multiple connections 255 are simultaneously established to multiple connecting wireless devices 292, a single instance of methodology 600 may be sequentially or iteratively performed for each connection 255 one at a time, or multiple instances of methodology 600 may be simultaneously performed at the same time for two or more of the multiple connections 255.

Still referring to FIG. 6, at least one designated connection characteristic (e.g., local device address, remote device address, received signal strength, advertisement sets, bonding information such as stored cryptographic keys, received signal AoA or AoD and/or any other requirements which may either be predefined and/or provided by a user, etc.) for a given connection 255 is determined in step 604, and a corresponding mask bit value 510 is determined in step 606 for the given connection 255 based on a respective resource filtering bit mask (e.g., 410, 412, 414, etc.) corresponding to the given connection 255. Next, in step 608 the allowed resources (e.g., one or more of services 225 and/or service characteristics thereof) corresponding to the assigned mask bit value 510 are determined for the given connection 255 from its respective resource filter 300 of FIG. 3. These allowed resources may be reported to the connecting device 292 (e.g., using GATT) in response to a service discovery request received from the connecting device 292, and then provided to the connecting device 292 over the given established connection 255 in step 610. Methodology 600 then returns from step 612 to step 604 for any remaining other non-processed existing or new connections 255 and/or if connection characteristics (e.g., such as received signal strength) for an existing connection 255 change.

Although methodology 600 of FIG. 6 has been described in relation to the exemplary embodiments of FIGS. 1-5, it will be understood that methodology 600 may be implemented with other wireless device hardware and software configurations, and/or with any non-BLE wireless protocols that provide resources across wireless connections established between different wireless devices. It will also be understood that methodology 600 of FIG. 6 is exemplary only, and that any other combination of additional, fewer, and/or alternative steps may be employed that is suitable for resource filtering to provide multiple different device personalities and/or multiple different resources from a single common radio frequency (RF)-enabled wireless device or apparatus to one or more other connecting RF-enabled wireless devices across different wireless connections.

It will also be understood that one or more of the tasks, functions, or methodologies described herein for a radio module or wireless device (e.g., including those described herein for components of application layer 210, host layer 220 and BLE controller 230 of FIG. 2A; module segment 110 including CPU 150, module segment 120 including link layer engine of FIG. 1, etc.) may be implemented using one or more programmable integrated circuits (e.g., central processing units (CPUs), processors, controllers, microcontrollers, microprocessors, hardware accelerators, FPGAs (field programmable gate arrays), ASICs (application specific integrated circuits), and/or other programmable integrated circuits) that are programmed to perform the operations, tasks, functions, or actions described herein for the disclosed embodiments. For example, the one or more programmable integrated circuits can be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a programmable integrated circuit such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodology disclosed herein. It will also be understood that one or more steps of the present methodologies may be employed in one or more code segments of the computer program. For example, a code segment executed by the information handling system may include one or more steps of the disclosed methodologies.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   executing at least one programmable integrated circuit of a first wireless device to form one or more wireless connections with one or more other wireless devices, each of the one or more formed wireless connections being a corresponding different wireless connection made between the first wireless device and a different one of the one or more other wireless devices, and each of the formed wireless connections having at least one connection characteristic;
   executing one or more applications on the at least one programmable integrated circuit to provide multiple resources on the first wireless device, each of the multiple resources not being known to the one or more other wireless devices; and
   then performing the following only after a given one of the one or more wireless connections is formed with a given one of the one or more other wireless devices and prior to providing any portion of the multiple resources across the given formed wireless connection and prior to receiving a service discovery request from the given one of the one or more other wireless devices:
      executing the at least one programmable integrated circuit to determine at least one connection characteristic of the given formed wireless connection prior to receiving the service discovery request across the given formed wireless connection,
      then, prior to receiving the service discovery request across the given formed wireless connection, executing the at least one programmable integrated circuit to determine a first portion of the multiple resources that will be filtered out from being discoverable and available across the given formed wireless connection based on the determined at least one connection characteristic of the given formed wireless connection, where an identity of the first portion of the multiple resources that will be filtered out from being discoverable and available across the given formed wireless connection is determined based on the determined at least one connection characteristic of the given formed wireless connection and prior to receiving the service discovery request across the given formed wireless connection;

then, prior to receiving the service discovery request across the given formed wireless connection, executing the at least one programmable integrated circuit to filter out the first portion of the multiple resources from being discoverable and available across the given formed wireless connection based on the at least one determined connection characteristic of the given formed wireless connection between the first wireless device and the given one of the one or more other wireless devices to select a second and remaining portion of the multiple resources that are allowed to be discovered by and available to the given one of the one or more other wireless devices across the given formed wireless connection; and then only providing any portion of the multiple resources across the given formed wireless connection after receiving the service discovery request across the given formed wireless connection from the given one of the one or more other wireless devices by:

executing the at least one programmable integrated circuit to make available and provide only the remaining portion of the multiple resources from the first wireless device to the given one of the one or more other wireless devices across the given formed wireless connection between the first wireless device and the given one of the one or more other wireless devices;

where the resources comprise at least one of Bluetooth Low Energy (BLE) Generic Attribute Profile (GATT) services, BLE GATT characteristics, BLE security manager, or a portion of a BLE GATT service.

2. The method of claim 1, where the one or more other wireless devices comprise multiple respective other wireless devices, the method further comprising only providing any portion of the multiple resources in response to receiving corresponding service discovery requests by:

executing the at least one programmable integrated circuit to form a different given formed wireless connection between the first wireless device and each of multiple different respective other wireless devices; and then, prior to receiving a service discovery request across the corresponding different given formed wireless connection between the first wireless device and each of multiple different respective other wireless devices and prior to providing any portion of the multiple resources across the given formed wireless connection, executing the at least one programmable integrated circuit to select a different remaining portion of the set of multiple resources for each corresponding one of the multiple different respective other wireless devices that will be allowed to be discovered by the corresponding one of the multiple different respective other wireless devices that is different than the remaining portion of the multiple resources selected for each of the other different multiple respective other wireless devices; and then, only after receiving a corresponding service discovery request, make available and provide only the remaining portion of the multiple resources for each given one of the multiple different respective other wireless devices from the first wireless device to the given one of the multiple respective other wireless devices across the corresponding different given formed wireless connection between the first wireless device and the given one of the multiple different respective other wireless devices and to provide a different device personality from the first wireless device to each of the multiple different respective other wireless devices.

3. The method of claim 1, where the determined at least one connection characteristic of the given formed wireless connection between the first wireless device and the given one of the one or more other wireless devices that is determined prior to receiving the service discovery request across the given formed wireless connection comprises at least one of remote device address, local device address, bonding information, received signal strength, advertisement sets, received signal angle of arrival or angle of departure.

4. The method of claim 1, where the determined at least one connection characteristic of the given formed wireless connection between the first wireless device and the given one of the one or more other wireless devices that is determined prior to receiving the service discovery request across the given formed wireless connection comprises remote device address or local device address.

5. The method of claim 1, where the determined at least one connection characteristic of the given formed wireless connection between the first wireless device and the given one of the one or more other wireless devices that is determined prior to receiving the service discovery request across the given formed wireless connection comprises received signal strength.

6. The method of claim 1, where the first wireless device comprises a host layer coupled to a radio transmitter and a radio receiver by a link layer; where the host layer is coupled between the link layer and an application layer; and where the method further comprises, prior to receiving a service discovery request across the corresponding different given formed wireless connection between the first wireless device and each of the multiple different respective other wireless devices, executing the at least one programmable integrated circuit to implement the host layer to select one or more resources to make available to each different given one of the one or more other wireless devices based on at least one determined connection characteristic of the formed wireless connection between the first wireless device and the different given one of the one or more other wireless devices.

7. The method of claim 1, where the first wireless device and the one or more other wireless devices are each a Bluetooth Low Energy (BLE) enabled device; where the resources comprise at least one of BLE Generic Attribute Profile (GATT) services, BLE GATT characteristics, BLE security manager, or a portion of a BLE GATT service.

8. The method of claim 7, where the resources comprise BLE Generic Attribute Profile (GATT) services; and where executing the at least one programmable integrated circuit to make available and provide only the remaining portion of the multiple resources for the given other wireless device further comprises using GATT data to report the allowed resources to the given other wireless device in response to a service discovery request received from the given other wireless device.

9. The method of claim 8, where the GATT data comprises at least one of a list of service universally unique identifiers (UUIDs) and/or service characteristic UUIDs.

10. The method of claim 7, where the resources are services that comprise at least one of alert notification profile, automation IO profile and automation service, battery service, body composition service, blood pressure profile, blood pressure service, heart rate service, lighting service, and home automation protocol.

11. The method of claim 1, where the first wireless device comprises pre-configured information stored in memory coupled to the at least one programmable integrated circuit prior to forming the one or more wireless connections with the one or more other wireless devices, the stored pre-configured information specifying the identity of the first portion of the multiple resources that are filtered out and specifying the identity of the second remaining portion of the multiple resources; and where the method further comprises executing the at least one programmable integrated circuit to retrieve the stored pre-configured information from the memory prior to using the stored pre-configured information to filter out a first portion of the multiple resources based on at least one connection characteristic of the wireless connection between the first wireless device and the given one of the one or more other wireless devices to select a second and remaining portion of the multiple resources that are allowed to be discovered by each given one of the one or more other wireless devices.

12. The method of claim 1, where the at least one connection characteristic is designated by a user.

13. The method of claim 1, further comprising executing the at least one programmable integrated circuit to use user-defined services of a filter to perform the determining of the first portion of the multiple resources that will be filtered out.

14. The method of claim 1, where the determined at least one connection characteristic of the given formed wireless connection between the first wireless device and the given one of the one or more other wireless devices that is determined prior to receiving the service discovery request across the given formed wireless connection comprises at least one of received signal angle of arrival or angle of departure.

15. An apparatus, comprising at least one programmable integrated circuit coupled to radio circuitry and configured to be coupled to an antenna as a first wireless device, the at least one programmable integrated circuit being programmed to:
  execute to form one or more wireless connections with one or more other wireless devices, each of the one or more formed wireless connections being a corresponding different wireless connection made between the first wireless device and a different one of the one or more other wireless devices, and each of the formed wireless connections having at least one connection characteristic;
  execute one or more applications to provide multiple resources on the first wireless device, each of the multiple resources not being known to the one or more other wireless devices; and
  then perform the following only after a given one of the one or more wireless connections is formed with a given one of the one or more other wireless devices and prior to providing any portion of the multiple resources across the given formed wireless connection and prior to receiving a service discovery request from the given one of the one or more other wireless devices:
    execute to determine at least one connection characteristic of the given formed wireless connection prior to receiving the service discovery request across the given formed wireless connection,
    then, prior to receiving the service discovery request across the given formed wireless connection, execute to determine a first portion of the multiple resources that will be filtered out from being discoverable and available across the given formed wireless connection based on the determined at least one connection characteristic of the given formed wireless connection, where an identity of the first portion of the multiple resources that will be filtered out from being discoverable and available across the given formed wireless connection is determined based on the determined at least one connection characteristic of the given formed wireless connection and prior to receiving the service discovery request across the given formed wireless connection,
    then, prior to receiving the service discovery request across the given formed wireless connection, execute to filter out the first portion of the multiple resources from being discoverable and available across the given formed wireless connection based on the at least one determined connection characteristic of the given formed wireless connection between the first wireless device and a given one of the one or more other wireless devices to select a second and remaining portion of the multiple resources that are allowed to be discovered by the given one of the one or more other wireless devices with only the remaining portion of the set of multiple resources known and available to the given one of the one or more other wireless devices across the given formed wireless connection; and
  then only provide any portion of the multiple resources across the given formed wireless connection after receiving the service discovery request across the given formed wireless connection from the given one of the one or more other wireless devices by:
    executing to make available and provide only the remaining portion of the multiple resources from the first wireless device to the given one of the one or more other wireless devices across the given formed wireless connection between the first wireless device and the given one of the one or more other wireless devices;
  where the resources comprise at least one of Bluetooth Low Energy (BLE) Generic Attribute Profile (GATT) services, BLE GATT characteristics, BLE security manager, or a portion of a BLE GATT service.

16. The apparatus of claim 15, where the at least one programmable integrated circuit is further programmed to:
  execute to form a different given formed wireless connection between the first wireless device and each of multiple different respective other wireless devices; and
  then, prior to receiving a service discovery request across the corresponding different given formed wireless connection between the first wireless device and each of multiple different respective other wireless devices and prior to providing any portion of the multiple resources across the given formed wireless connection, execute to select a different remaining portion of the set of multiple resources for each corresponding one of the multiple different respective other wireless device that will be allowed to be discovered by the corresponding one of the multiple different respective other wireless devices that is different than the remaining portion of the multiple resources selected for each of the other multiple respective other wireless devices; and
  then, only after receiving a corresponding service discovery request, make available and provide only the remaining portion of the multiple resources for each given one of the multiple different respective other wireless devices from the first wireless device to the given one of the multiple respective other wireless devices across the corresponding different given formed wireless connection between the first wireless device and the given one of the multiple different respective other wireless devices and provide a different device personality from the first wireless device to each of the multiple different respective other wireless devices.

17. The apparatus of claim 15, where the determined at least one connection characteristic of the given formed wireless connection between the first wireless device and the given one of the one or more other wireless devices that is determined prior to receiving the service discovery request across the given formed wireless connection comprises at least one of remote device address, local device address, bonding information, received signal strength, advertisement sets, received signal angle of arrival or angle of departure.

18. The apparatus of claim 15, where the determined at least one connection characteristic of the given formed wireless connection between the first wireless device and the given one of the one or more other wireless devices that is determined prior to receiving the service discovery request across the given formed wireless connection comprises remote device address or local device address.

19. The apparatus of claim 15, where the determined at least one connection characteristic of the given formed wireless connection between the first wireless device and the given one of the one or more other wireless devices that is determined prior to receiving the service discovery request across the given formed wireless connection comprises received signal strength.

20. The apparatus of claim 15, where the at least one programmable integrated circuit is programmed to execute a host layer coupled to the radio circuitry by a link layer; where the host layer is coupled between the link layer and an application layer implemented by the at least one programmable integrated circuit; and where the at least one programmable integrated circuit is further programmed to, prior to receiving a service discovery request across the corresponding different given formed wireless connection between the first wireless device and each of the multiple different respective other wireless devices, execute the host layer to select one or more resources to make available to each different given one of the one or more other wireless devices based on at least one determined connection characteristic of the formed wireless connection between the first wireless device and the different given one of the one or more other wireless devices.

21. The apparatus of claim 15, where the first wireless device is a Bluetooth Low Energy (BLE) enabled device; where the resources comprise at least one of BLE Generic Attribute Profile (GATT) services, BLE GATT characteristics, BLE security manager, or a portion of a BLE service.

22. The apparatus of claim 15, where the first wireless device comprises pre-configured information stored in memory coupled to the at least one programmable integrated circuit prior to forming the one or more wireless connections with the one or more other wireless devices, the stored pre-configured information specifying the identity of the first portion of the multiple resources that are filtered out and specifying the identity of the second remaining portion of the multiple resources; and where the programmable integrated circuit is further programmed to execute to retrieve the stored pre-configured information from the memory prior to using the stored pre-configured information to filter out a first portion of the multiple resources based on at least one connection characteristic of the wireless connection between the first wireless device and the given one of the one or more other wireless devices to select a second and remaining portion of the multiple resources that are allowed to be discovered by each given one of the one or more other wireless devices.

23. The apparatus of claim 15, where the at least one connection characteristic is designated by a user.

24. The apparatus of claim 15, where the at least one programmable integrated circuit being programmed to execute to use user-defined services of a filter to determine the first portion of the multiple resources that will be filtered out.

25. The apparatus of claim 15, where the determined at least one connection characteristic of the given formed wireless connection between the first wireless device and the given one of the one or more other wireless devices that is determined prior to receiving the service discovery request across the given formed wireless connection comprises at least one of received signal angle of arrival or angle of departure.

26. A system comprising:
a first wireless device;
a second wireless device comprising at least one programmable integrated circuit coupled to radio circuitry, the at least one programmable integrated circuit being programmed to:
  execute to form one or more wireless connections with one or more other wireless devices including the first wireless device, each of the one or more formed wireless connections being a corresponding different wireless connection made between the second wireless device and a different one of the one or more other wireless devices, and each of the formed wireless connections having at least one connection characteristic;
  execute one or more applications to provide multiple resources on the second wireless device, each of the multiple resources not being known to the one or more other wireless devices,
  then perform the following only after a first one of the one or more wireless connections is formed with the first wireless device and prior to providing any portion of the multiple resources across the formed first wireless connection and prior to receiving a service discovery request from the first wireless device:
    execute to determine at least one connection characteristic of the formed first wireless connection prior to receiving the service discovery request across the formed first wireless connection from the first wireless device,
    then, prior to receiving the service discovery request across the formed first wireless connection, execute to determine a first portion of the multiple resources that will be filtered out from being discoverable and available across the formed first wireless connection based on the determined at least one connection characteristic of the formed first wireless connection, where an identity of the first portion of the multiple resources that will be filtered out from being discoverable and available across the formed first wireless connection is determined based on the determined at least one connection characteristic of the formed first wireless connection and prior to receiving the service discovery request across the formed first wireless connection from the first wireless device, then, prior to receiving the service discovery request across the given formed wireless connection, execute to filter out the first portion of the multiple resources from being discoverable and available across the formed first wireless connection based on the at least one determined connection characteristic of the formed first wireless connection between the second wireless device and the first wireless device to select a second and remaining portion of the multiple resources that are allowed to be discovered by the first wireless device and available to the first wireless device across the formed first wireless connection, and then only provide any portion of the multiple resources across the formed first wireless connection after receiving the service discovery request across the formed first wireless connection from the first wireless device by:

executing to make available and provide only the remaining portion of the multiple resources from the second wireless device to the first wireless device across the formed first wireless connection between the second wireless device and the first wireless device;

where the resources comprise at least one of Bluetooth Low Energy (BLE) Generic Attribute Profile (GATT) services, BLE GATT characteristics, BLE security manager, or a portion of a BLE GATT service.

27. The system of claim 26, where the first wireless device and the second wireless device are each a Bluetooth Low Energy (BLE) enabled device; and where the resources comprise at least one of BLE Generic Attribute Profile (GATT) services, BLE GATT characteristics, BLE security manager, or a portion of a BLE GATT service.

28. A system comprising:

a first wireless device;

a second wireless device comprising at least one programmable integrated circuit coupled to radio circuitry, the at least one programmable integrated circuit being programmed to:

execute to form one or more wireless connections with one or more other wireless devices including the first wireless device, each of the one or more formed wireless connections being a corresponding different wireless connection made between the second wireless device and a different one of the one or more other wireless devices, and each of the formed wireless connections having at least one connection characteristic;

execute to provide multiple resources on the second wireless device that are not known to the one or more other wireless devices, and then perform the following only after a first one of the one or more wireless connections is formed with the first wireless device and prior to providing any portion of the multiple resources across the formed first wireless connection and prior to receiving a service discovery request from the first wireless device:

execute to determine at least one connection characteristic of the formed first wireless connection prior to receiving the service discovery request across the formed first wireless connection from the first wireless device, then, prior to receiving the service discovery request across the formed first wireless connection, execute to determine a first portion of the multiple resources that will be filtered out from being discoverable and available across the formed first wireless connection based on the determined at least one connection characteristic of the formed first wireless connection, where an identity of the first portion of the multiple resources that will be filtered out from being discoverable and available across the formed first wireless connection is determined based on the determined at least one connection characteristic of the formed first wireless connection and prior to receiving the service discovery request across the formed first wireless connection from the first wireless device, then, prior to receiving the service discovery request across the formed first wireless connection, execute to filter out the first portion of the multiple resources from being discoverable and available across the formed first wireless connection based on the at least one determined connection characteristic of the formed first wireless connection between the second wireless device and the first wireless device to select a second and remaining portion of the multiple resources that are allowed to be discovered by the first wireless device and available to the first wireless device across the formed first wireless connection, and then only provide any portion of the multiple resources across the formed first wireless connection after receiving the service discovery request across the formed first wireless connection from the first wireless device by:

executing to make available and provide only the remaining portion of the multiple resources from the second wireless device to the first wireless device across the formed first wireless connection between the second wireless device and the first wireless device; and a third wireless device; and where the at least one programmable integrated circuit of the second wireless device is programmed to:

execute to cause the second wireless device to form a second wireless connection between the second wireless device and the third wireless device, then perform the following only after the second wireless connection is formed between the second wireless device and the third wireless device and prior to providing any portion of the multiple resources across the formed second wireless connection and prior to receiving a service discovery request from the third wireless device:

execute to determine at least one connection characteristic of the formed second wireless connection prior to receiving the service discovery request across the formed second wireless connection from the third wireless device, then, prior to receiving the service discovery request across the formed second wireless connection, execute to determine a first portion of the multiple resources that will be filtered out from being discoverable and available across the formed second wireless connection based on the determined at least one connection characteristic of the formed second wireless connection, where an identity of the first portion of the multiple resources that will be filtered out from being discoverable and available across the formed second wireless connection is determined based on the determined at least one connection characteristic of the formed second wireless connection and prior to receiving the service discovery request across the formed second wireless connection from the third wireless device, then, prior to receiving the service discovery request across the formed second wireless connection, execute to use at least one connection characteristic of the second wireless connection formed between the second wireless device and the third wireless device to select a different remaining portion of the multiple resources for the third wireless device that are allowed to be discovered by the third wireless device that is different than the remaining portion of the multiple resources selected for the first wireless device, and then only provide any portion of the multiple resources across the formed second wireless connection after receiving the service discovery request across the formed second wireless connection from the third wireless device by:

executing to make available and provide only the second and different remaining portion of the multiple resources for the third wireless device from the second wireless device to the third wireless device across the formed second wireless connection between the second wireless device and the third wireless device and provide a different device personality from the second wireless device to each of the first wireless device and the third wireless device, the at least one connection characteristic of the second wireless connection being different than the at least one connection characteristic of the first wireless connection, and the one or more resources selected for the third wireless device being different than the one or more resources selected for the first wireless device;

where the at least one programmable integrated circuit of the second wireless device is programmed to execute to make available and provide only the remaining portion of the resources for the third wireless device from the second wireless device to the third wireless device across the second wireless connection between the second wireless device and the third wireless device and provide a different device personality from the second wireless device to each of the first and third wireless devices.

29. The system of claim 28, where the at least one connection characteristic of the first wireless connection between the second wireless device and the first wireless device comprises at least one of remote device address, local device address, bonding information, received signal strength, advertisement sets, received signal angle of arrival or angle of departure; and where the at least one different connection characteristic of the second wireless connection between the second wireless device and the third wireless device comprises at least one of remote device address, local device address, bonding information, received signal strength, advertisement sets, received signal angle of arrival or angle of departure.

30. The system of claim 28, where the at least one connection characteristic of the first wireless connection between the second wireless device and the first wireless device comprises remote device address or local device address; and where the at least one different connection characteristic of the second wireless connection between the second wireless device and the third wireless device comprises remote device address or local device address.

31. The system of claim 28, where the at least one connection characteristic of the first wireless connection between the second wireless device and the first wireless device comprises received signal strength; and where the at least one different connection characteristic of the second wireless connection between the second wireless device and the third wireless device comprises received signal strength.

32. The system of claim 28, where the at least one programmable integrated circuit of the second wireless device is programmed to execute a host layer coupled to the radio circuitry by a link layer; where the host layer is coupled between the link layer and an application layer implemented by the at least one programmable integrated circuit; and where the at least one programmable integrated circuit is further programmed to execute the host layer to select each of the one or more resources for the first wireless device and the different one or more resources selected for the third wireless device.

33. The system of claim 28, where pre-configured information is stored in memory coupled to the at least one programmable integrated circuit of the second wireless device prior to forming the first wireless connection with the first wireless device and the second wireless connection with the third wireless device, the stored pre-configured information specifying the identity of the first portion of the multiple resources that are filtered out and specifying the identity of the second remaining portion of the multiple resources for each of the first and third wireless devices; and where the programmable integrated circuit of the second wireless device is further programmed to execute to retrieve the stored pre-configured information from the memory prior to using the stored pre-configured information to filter out respective portions of the multiple resources based on at least one connection characteristic of each of the first and second wireless connections between the second wireless device and the respective first and third wireless devices to select the respective remaining portions of the multiple different resources that are allowed to be discovered by each of the respective first and third wireless devices.

* * * * *